A. B. COWLES.
BOX FOLDING MACHINE.
APPLICATION FILED APR. 21, 1906.

978,702.

Patented Dec. 13, 1910.
8 SHEETS—SHEET 1.

Witnesses
Walter B. Payne
Florence E. Franck

Inventor
Arthur B. Cowles
By Frederick F. Church
his Attorney

A. B. COWLES.
BOX FOLDING MACHINE.
APPLICATION FILED APR. 21, 1906.

978,702.

Patented Dec. 13, 1910.
8 SHEETS—SHEET 4.

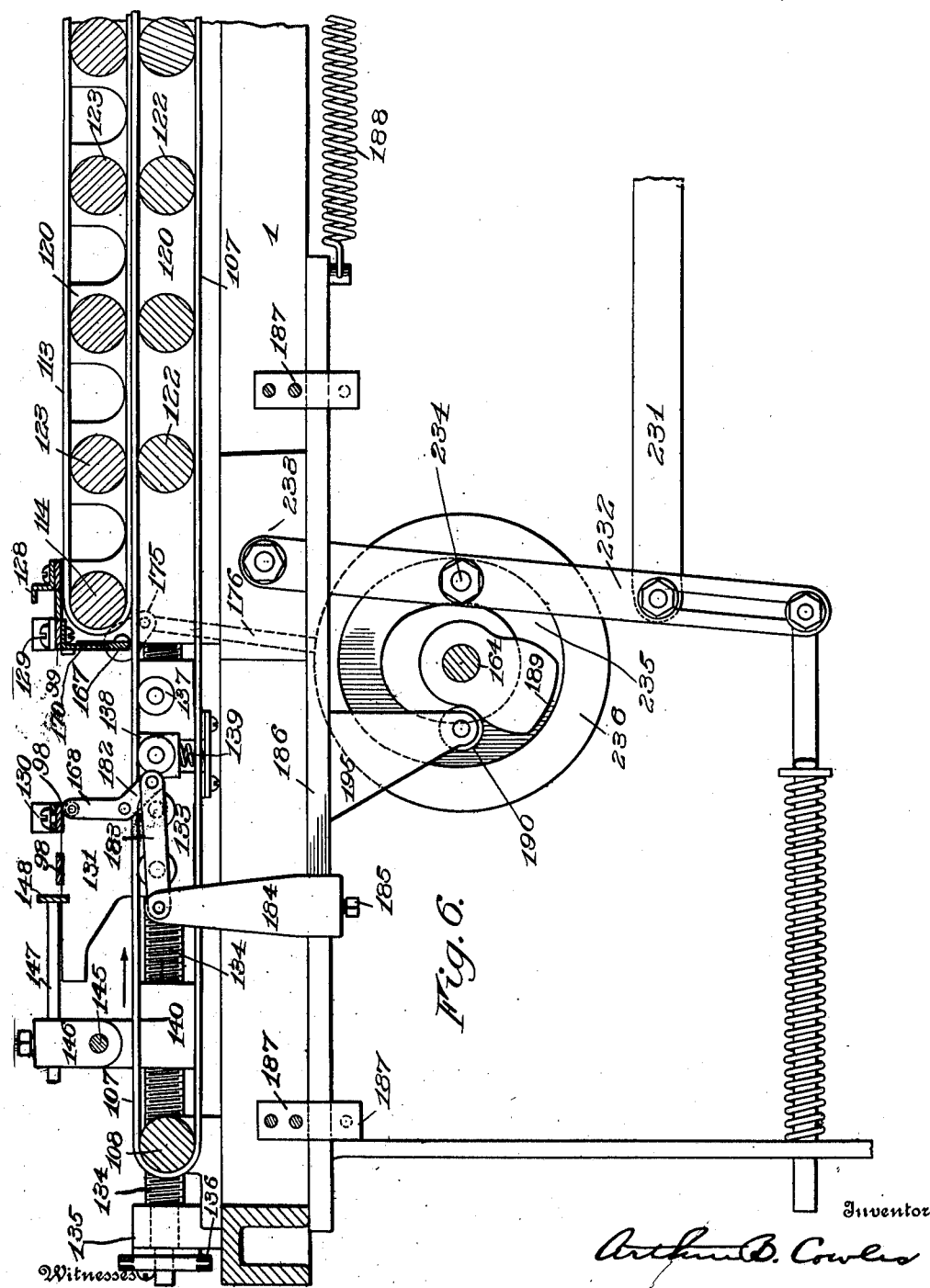

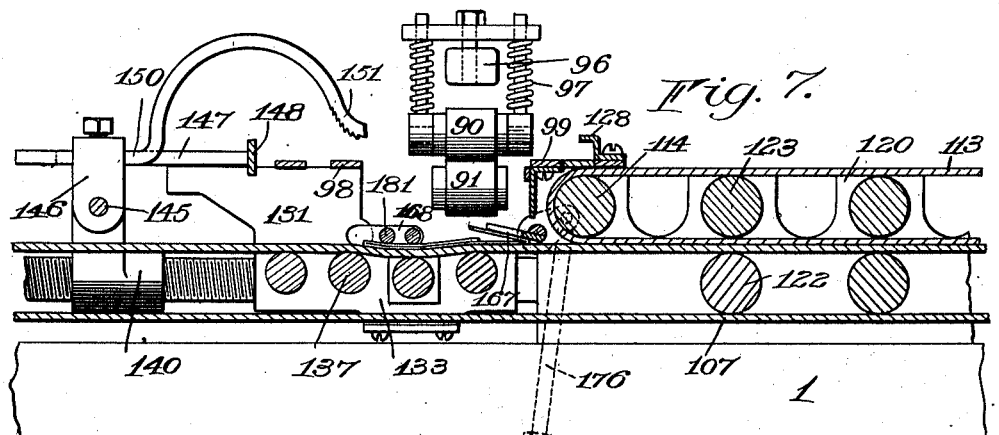
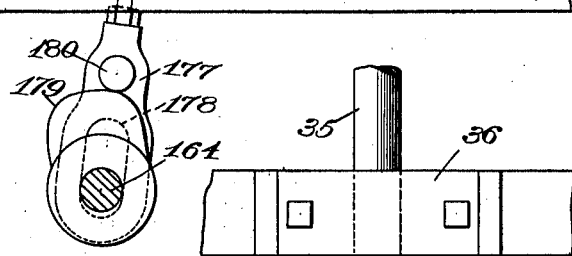
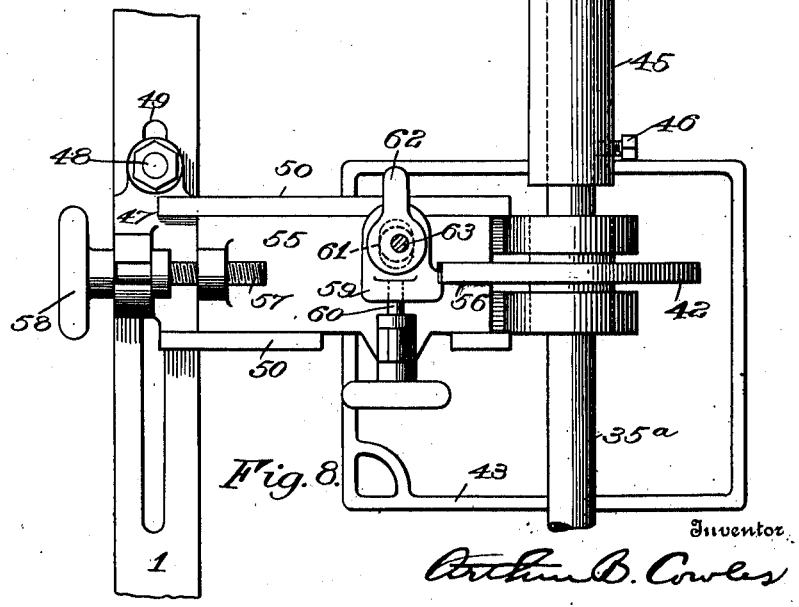

A. B. COWLES.
BOX FOLDING MACHINE.
APPLICATION FILED APR. 21, 1906.
978,702.
Patented Dec. 13, 1910.
8 SHEETS—SHEET 7.
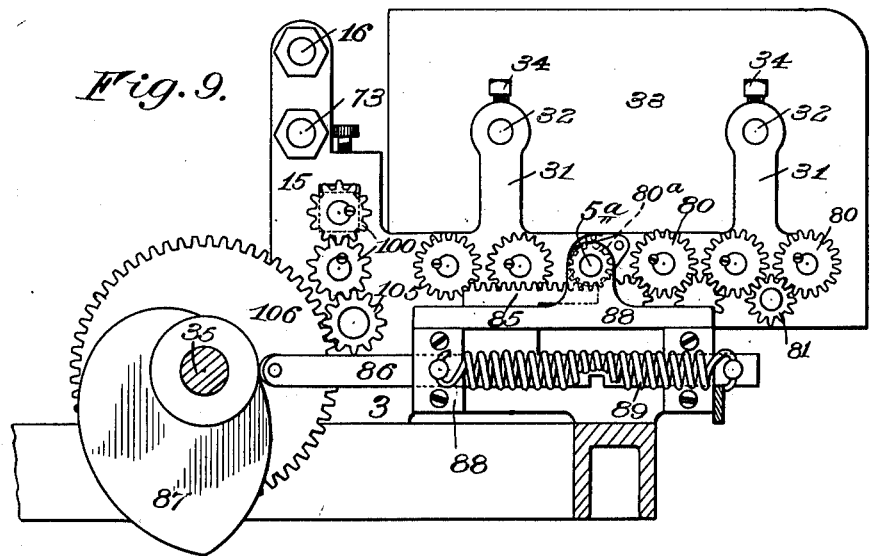
Fig. 9.
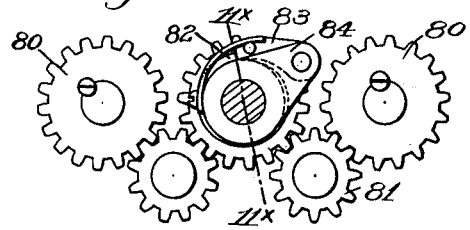
Fig. 10.
Fig. 11.
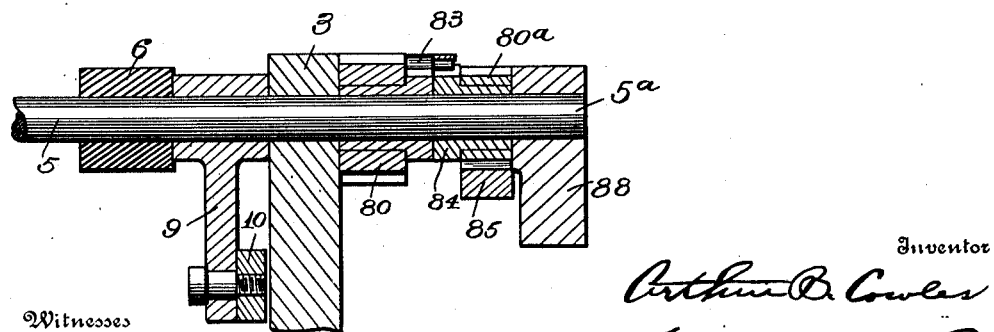
Witnesses
Walter B. Payne
Elanie E. Franck
Inventor
Arthur B. Cowles
By Frederick F. Church
his Attorney

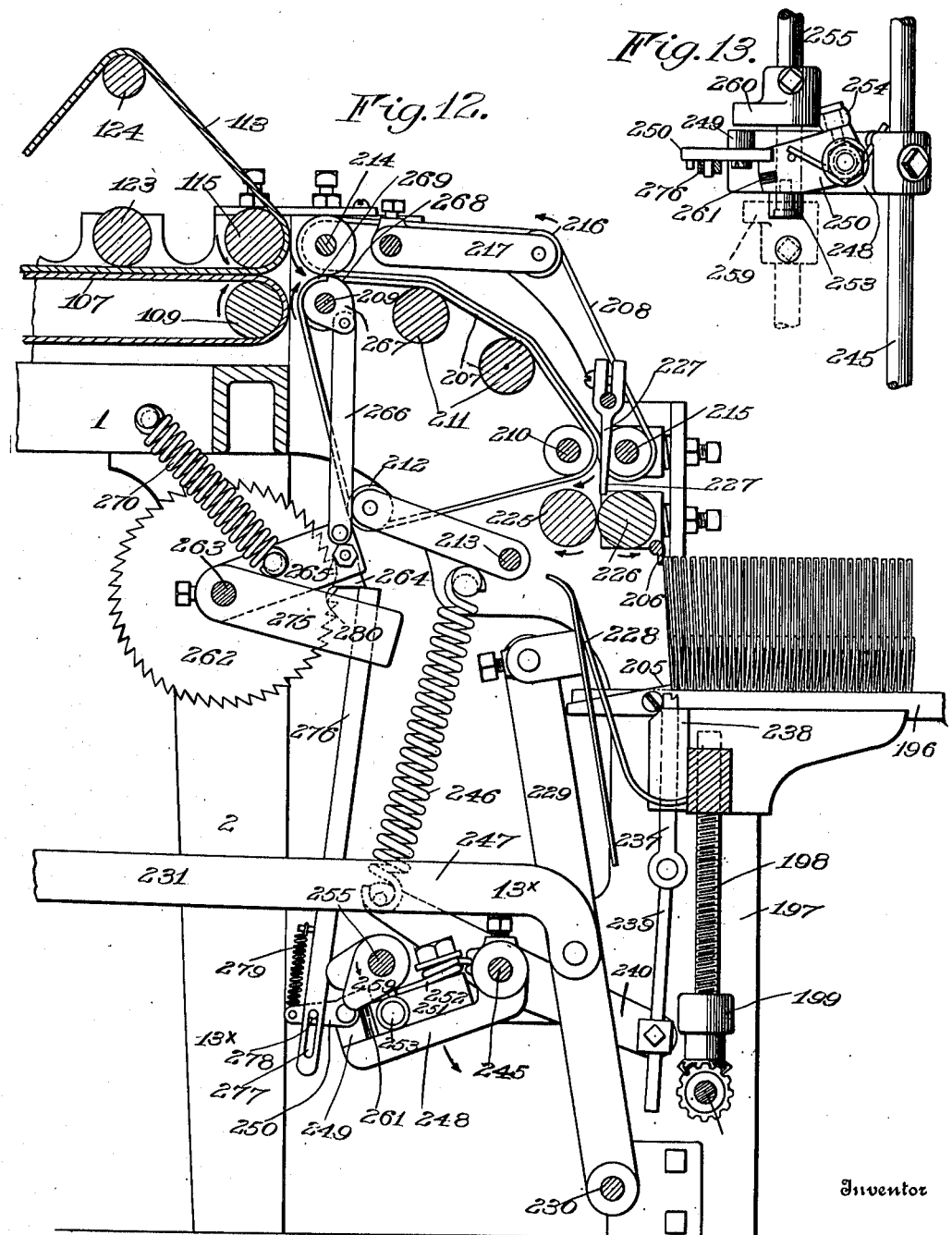

UNITED STATES PATENT OFFICE.

ARTHUR B. COWLES, OF ROCHESTER, NEW YORK.

BOX-FOLDING MACHINE.

978,702.

Specification of Letters Patent. Patented Dec. 13, 1910.

Application filed April 21, 1906. Serial No. 312,357.

*To all whom it may concern:*

Be it known that I, ARTHUR B. COWLES, of Rochester, in the county of Monroe and State of New York, have invented certain new and useful Improvements in Box-Folding Machines; and I do hereby declare the following to be a full, clear, and exact description of the same, reference being had to the accompanying drawings, forming a part of the specification, and to the reference-numerals marked thereon.

My present invention has for its object to provide a machine for folding paper box blanks, after the glue or adhesive material has been applied thereto, and it comprises generally mechanism for feeding the blanks from a stack or pile, devices for turning up and overlapping their edges or flaps and delivery apparatus which holds said flaps in engagement until the adhesive material has set and finally depositing them in a row or stack with predetermined blanks offset from the others to enable the operator to keep an accurate count of the folded boxes.

My invention has for its further object to provide such an arrangement of parts that the machine may be readily adjusted to fold boxes of various lengths and widths and the various operations performed with great rapidity.

To these and other ends the invention consists in certain improvements and combinations of parts all as will be hereinafter more fully described, the novel features being pointed out in the claims at the end of the specification.

Figure 1:
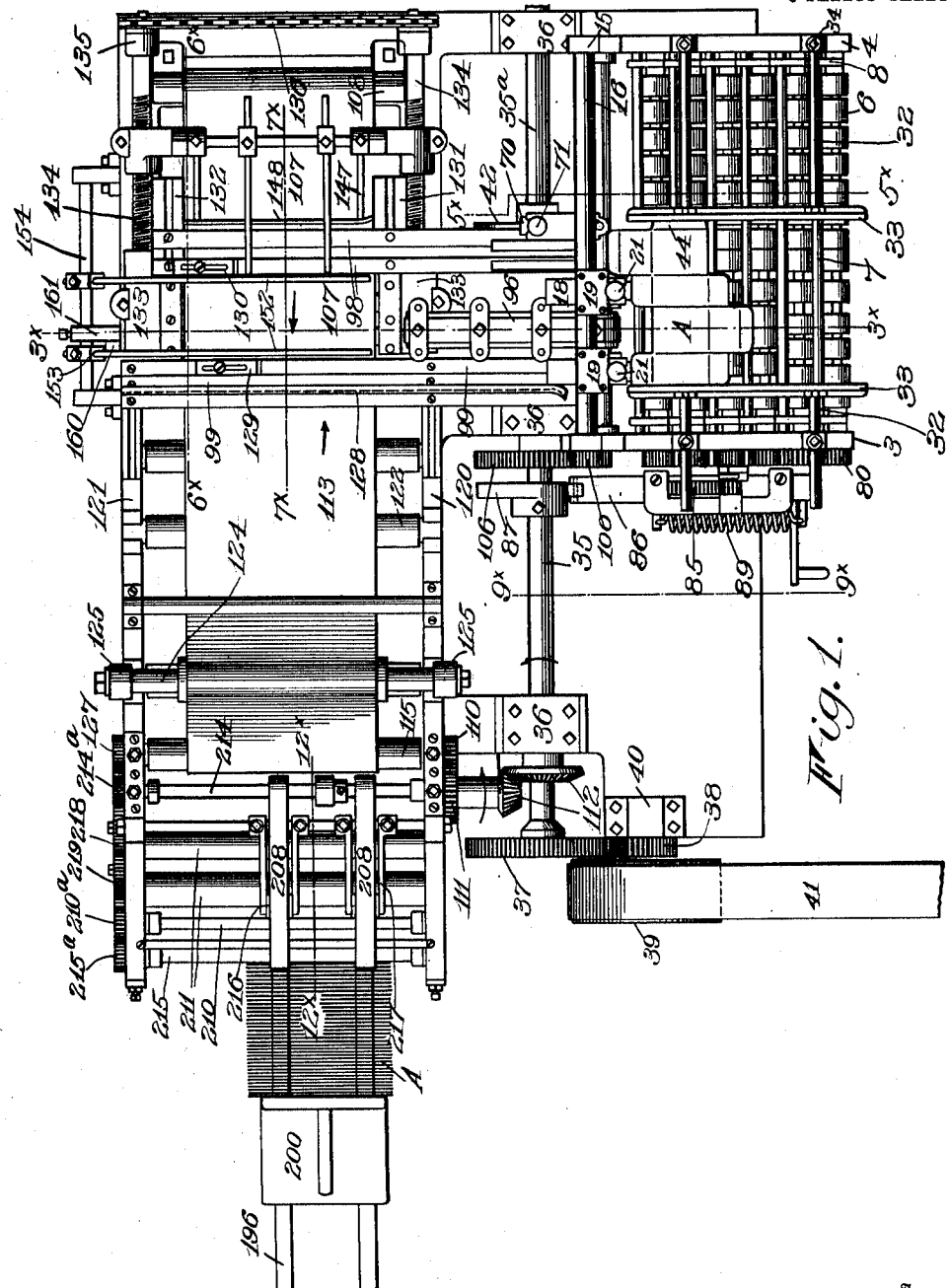
Figure 2:
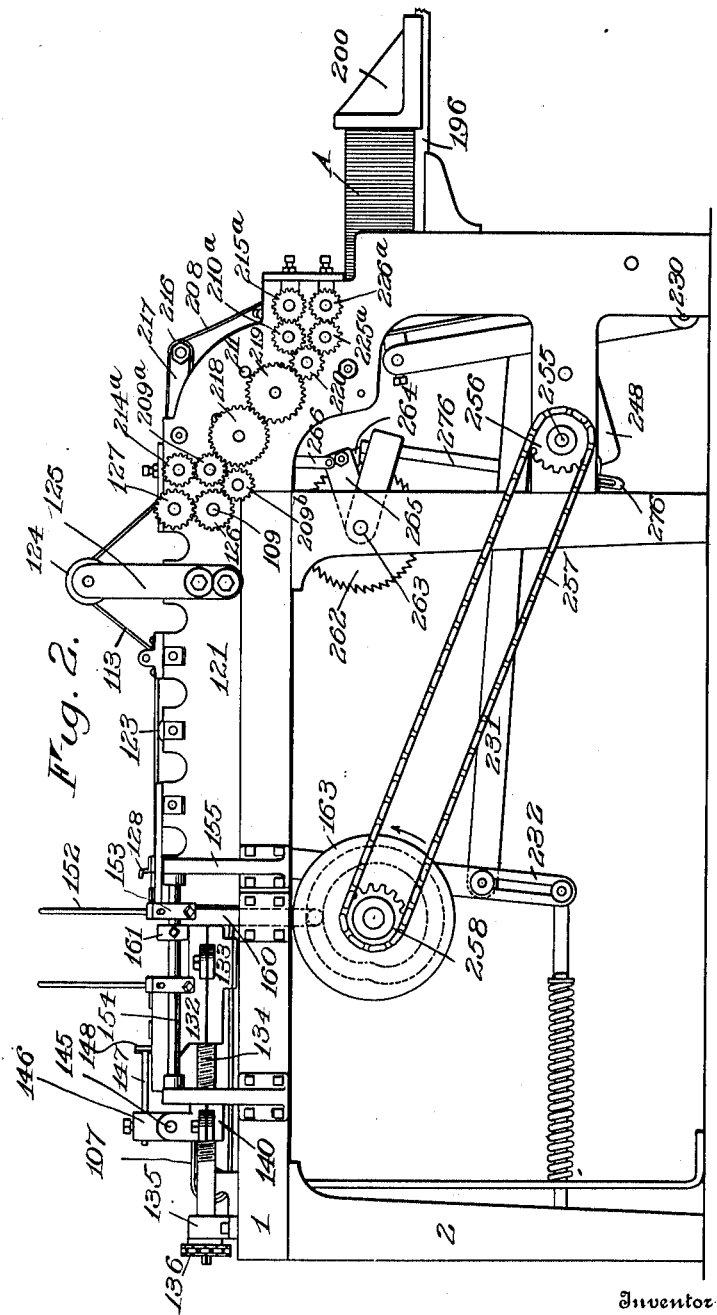
Figure 3:
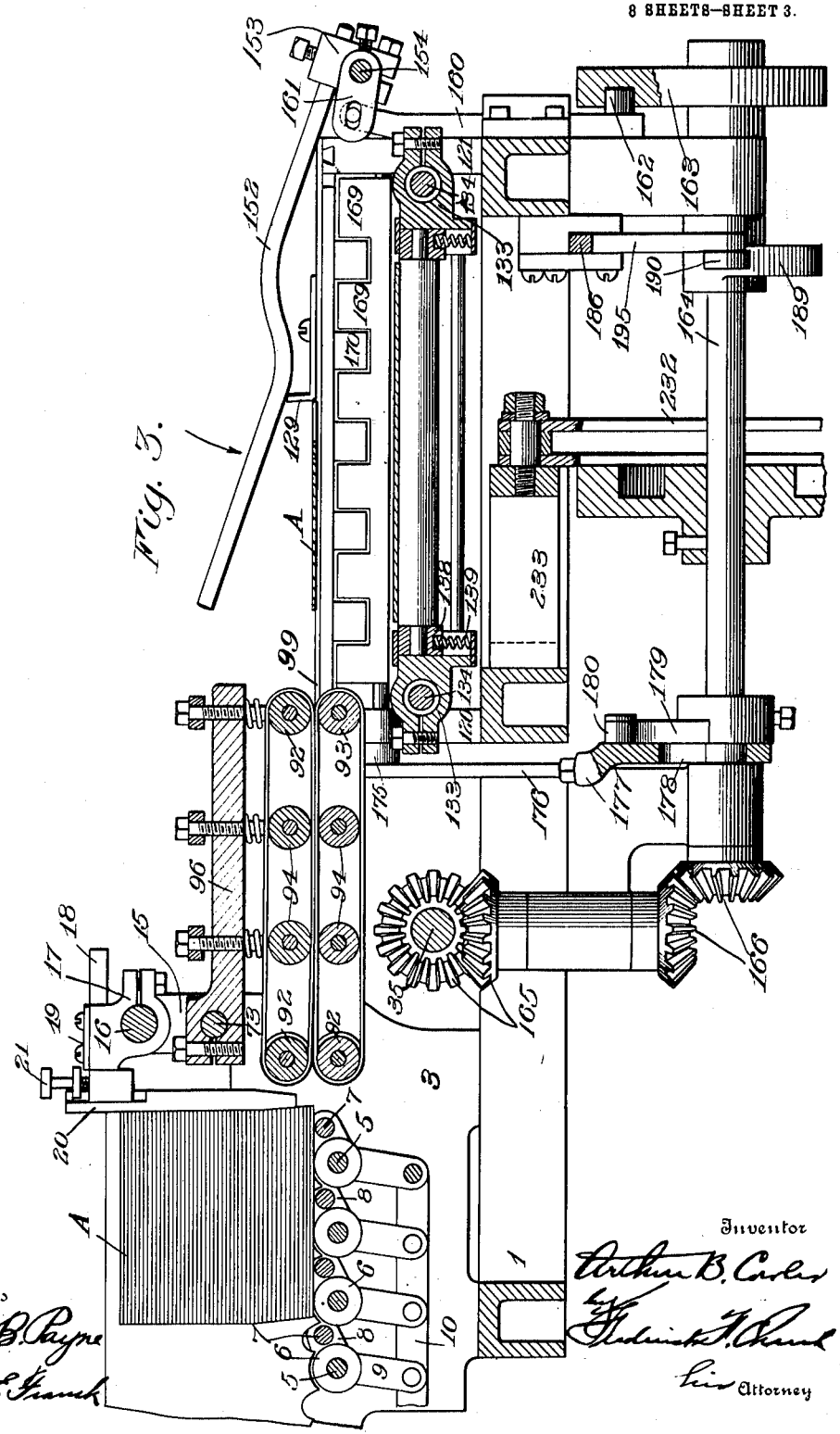
Figure 4:
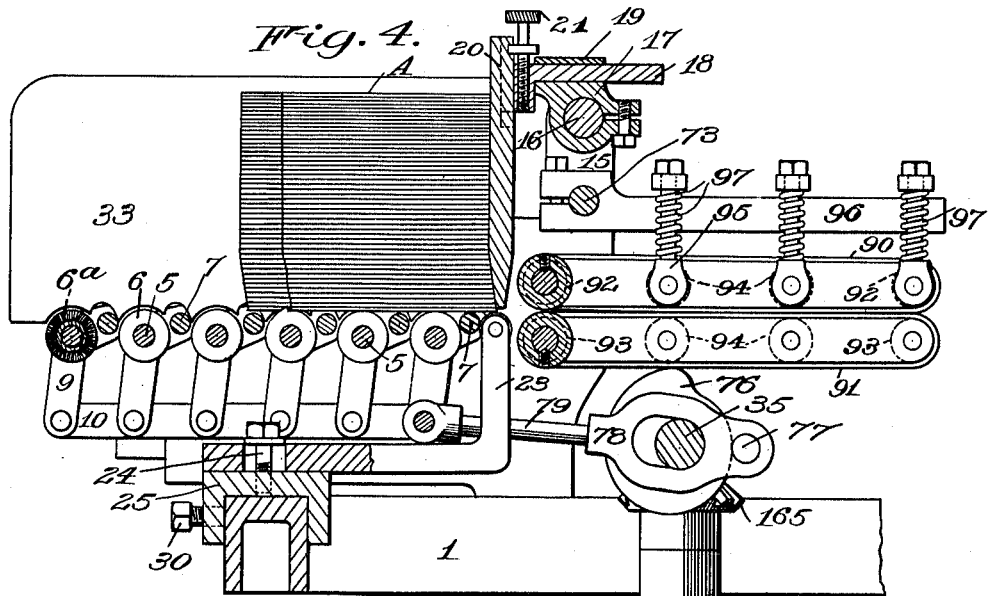
Figure 5:
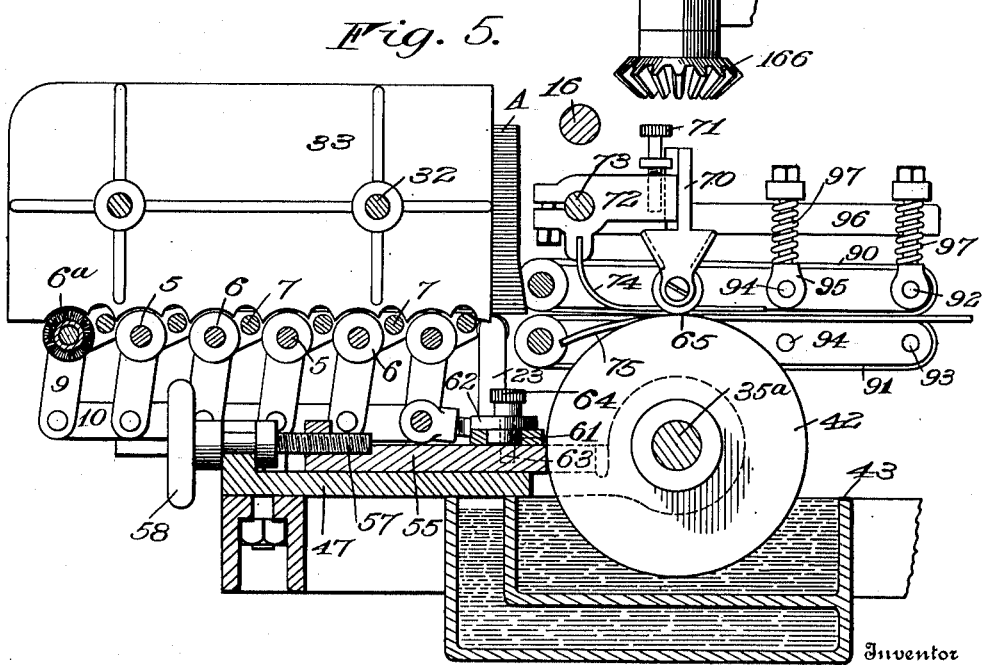

In the drawings: Figure 1 is a top plan view of a box folding machine constructed in accordance with my invention. Fig. 2 is an elevation of the rear side of the machine. Fig. 3 is a cross sectional view on the line 3ˣ 3ˣ of Fig. 1, showing the rack and the folding devices. Fig. 4 is an enlarged detail sectional view, similar to Fig. 3, illustrating the feeding devices. Fig. 5 is a sectional detail view on the line 5ˣ 5ˣ of Fig. 1. Fig. 6 is a detail view partly in section taken on the line 6ˣ 6ˣ of Fig. 1, showing the folding devices in normal position. Fig. 7 is a similar view taken on the line 7ˣ 7ˣ of Fig. 1, illustrating the operation of the folding devices. Fig. 8 is a detail plan view of the glue wheel and the scraping devices coöperating therewith. Fig. 9 is a detail side elevation of the stack rack, adjacent parts being shown in section taken on the line 9ˣ 9ˣ of Fig. 1. Fig. 10 is a detail view illustrating the mechanism employed for operating the feeding devices. Fig. 11 is a sectional view taken on the line 11ˣ 11ˣ of Fig. 10. Fig. 12 is a vertical sectional view taken on the line 12ˣ 12ˣ of Fig. 1, showing the blank delivering devices and the counting mechanism, and Fig. 13 is a detail view of the trip block as seen when looking in the direction indicated by the arrows on the section line 13ˣ 13ˣ of Fig. 12.

Similar reference numerals in the several figures indicate similar parts.

A box folding machine constructed in accordance with my invention is adapted to fold and glue paper boxes after they have been cut and scored and it comprises a rack adapted to receive a stack or pile of the box blanks, devices for projecting the lowermost blank at the bottom of the stack and folding devices which strike up the lateral edges or side flaps of the flat sheet and deliver it in a folded condition onto a conveyer which eventually deposits the folded box in a knock-down condition onto a receiving table. Suitable mechanism is interposed between the stack rack and folding devices for transporting the blank projected from the former, which carries one of the edges of the blank in engagement with the means employed for supplying it with glue or adhesive material contained in a suitable receptacle and the carrying devices which receive the blank are also adapted to hold its folded edges in contact until the adhesive material has set or hardened. The machine is adapted to operate upon blanks of various lengths and widths and to this end its various parts are capable of being readily adjusted.

The machine illustrated as showing the present embodiment of my invention consists of a frame or table 1 supported at a convenient elevation upon legs 2. At the forward side of the frame is located a rack adapted to contain a stack or pile of box blanks A comprising vertically extending end pieces 3 and 4 between which extend a plurality of shafts 5 arranged in horizontal alinement and spaced equidistantly from each other, as shown particularly in Figs. 3, 4 and 5. Each shaft is provided with a plurality of feeding rolls 6, preferably constructed of yielding material, such as rubber or of radially extending bristles, as indicated by 6ᵃ in Fig. 4. The bottom of the rack is composed of a plurality of rods 7, located between the rollers 6 on adjacent shafts, adapted to be moved upwardly and downwardly to agitate the stack of blanks and normally support them out of engagement with the rolls 6 and only allow the stack to descend into engagement with them at proper intervals, when it is desired to feed or project a blank. This movement of the bottom of the rack is accomplished by supporting the extremities of each of the rods 7 on arms 8 of bell crank levers, pivoted on the shafts 5, having the downwardly extending ends 9 which are connected for simultaneous operation by a rod 10 which is shifted intermittently, as will be further described.

The forward edges of the end pieces 3 and 4 are extended upwardly, as indicated at 15, and supported on said extensions is a guide rod 16 on which are adjustably supported two or more heads 17 carrying arms 18, adjustably secured beneath cap plates 19, the ends of said arms being provided with ways in which are mounted gages 20, having the downwardly extending ends, which are adjustable relatively to the floor of the rack by screws 21. Coöperating with each of the gages is a guide roll 22, mounted on an arm 23 and supported in alinement with the tops of the feed rollers 6. The rear ends of the arms 23 extend laterally beneath the rack and are adjustably secured by a bolt 24 to a head 25 which is longitudinally movable on the side piece of the frame 1 and is normally secured thereto by a bolt 30. The end pieces 3 and 4 of the rack are also provided with upwardly extending arms or brackets 31 having perforations at their upper ends guiding the rods 32, supporting the side pieces 33 of the rack, which are secured in adjusted position by means of set screws 34.

Located in front of the rack and extending parallel therewith is the main driving shaft 35, journaled in bearings 36 and provided at one end with a gear wheel 37 meshing with the pinion 38 attached to a pulley 39, having an axle supported in the bearing 40, said pulley being adapted to receive a belt or other driving connection 41, as shown in Fig. 1. Connected to this shaft is a glue applying roller 42 which is positioned in alinement with one of the side edges of the rack and adapted to transfer the glue or adhesive material, from a suitable receptacle 43, to the pasting flap 44 located at the extreme edge of a blank. Adjustment of the roller is permitted by providing the shaft 35 with a longitudinally adjustable end 35ª which is secured in a sleeve or collar 45 by means of a set screw 46, as illustrated in Fig. 8.

In order to regulate the quantity of the adhesive material supplied to the pasting flap of the blank, scraping devices coöperate with the lateral edges and face of the wheel which are also adjustable on the side portion of frame 1. These devices comprise a bracket 47 having a split inner end, the bifurcations of which surround the hub of the glue wheel, which is also secured to the frame 1 by a bolt 48 extending through a slot 49 in the frame. At the sides of the bracket are upwardly projecting ribs or flanges 50 between which is guided a slide 55 notched at its inner end, as indicated at 56, to receive the edge of the glue wheel, the edges of said notch operating as scrapers. The slide is also capable of adjustment relatively toward and from the wheel by means of a screw 57 provided with a hand wheel 58. The quantity of glue or adhesive material carried on the periphery of the glue wheel 42 may be further regulated by a scraper 59 adjustable transversely on the slide 55 by means of a screw 60 to which it is loosely connected. The adjustment of this scraper toward and from the face of the wheel is effected by a cam 61, shown in dotted lines in Fig. 8, resting in an elongated aperture in the scraper 59 and secured to an arm 62, said arm and cam being journaled on a stud 63 threaded into the slide 55 and provided with a knurled head 64 (Fig. 5) by means of which the screw may be rotated to clamp the cam in the desired position of adjustment. It will be noticed that the scraper 59 may be regulated so that the glue or adhesive material is only carried at one side of the rim of the wheel, at its upper edge. The pressing roll 65 is offset slightly from the center of the rim of the glue wheel 42 and is supported above that portion of the rim from which the adhesive material has been scraped and as the pressing roll is adjusted so that it does not engage the glue wheel it will be seen that the thin film of material carried on the latter will not engage the pressing roll when the pasting flap of the blank is not passing between these parts, which prevents the presser roller from collecting adhesive material and subsequently applying it to the upper face of a blank. The presser roller is carried upon a vertically movable head 70, held in adjusted position by a set screw 71, carried on an arm 72, adjustable longitudinally on a rod 73, arranged beneath the rod or guide 16, also supported on the end pieces 3 and 4 of the rack. In order to properly guide the projected end of a blank between the rollers 42 and 65 a depending curved arm 74 extends downwardly beneath the head 72 and beneath this is a similar guide having a downwardly extending forward end 75, as shown particularly in Fig. 5.

The intermittent raising and lowering movement of the bottom of the rack, heretofore mentioned, is caused by a cam 76, on the shaft 35, which engages a pin 77 on a yoke 78 connected by a link 79 to the rod 10, the rearward movement of which rotates the bell crank levers and lowers the floor rods or supports 7 permitting the blanks to rest upon the feed rollers 6. The latter may be rotated continuously, but it is preferable to operate them intermittently as it facilitates the successive projection of the blanks at regular intervals. Each of the shafts 5 is provided at one end with a gear wheel 80 and all of these are connected to rotate in the same direction by idlers 81. On one of the shafts, such as 5ª, the gear wheel is provided with a hub having a single ratchet tooth 82 with which coöperates a spring pressed pawl 83, on an arm 84, attached to a gear wheel 80ª journaled loosely on the extended end of said shaft. Coöperating with the gear wheel 80ª is a rack 85 having a bar 86 coöperating with a cam 87 on the shaft 35 by means of which it is moved outwardly in guides 88 against the tension of a spring 89 which moves the rack in the opposite direction. By this arrangement it will be seen that when the rack is moved outwardly motion is imparted to the gear wheel 80ª and through the pawl 83 to the shaft 5ª and by the intermeshing gear wheels 80 and 81 to each of the shafts 5.

The transporting devices for carrying a box blank from the rack to the folding devices consist of a conveyer comprising upper and lower belts 90 and 91 supported at their ends on rollers 92—92 and 93—93 respectively, and at intermediate points by rollers 94. The rollers of the lower belt are rigidly mounted in suitable bearings and the rollers 92 and 93 of the upper belt are carried in movable bearings 95, supported on an arm 96 extending rearwardly from the bar 73 and operated downwardly by coil springs 97. The adjacent stretches of the belts 90 and 91 are arranged in alinement with the tops of the feed rolls 6 and they are arranged between rearwardly extending parallel guides 98 and 99. The shafts carrying the rollers 92 and 93, at the forward ends of the belts, are provided at their outer ends with gear wheels 100 rotated by a pinion 105 meshing with the gear wheel 106 on the shaft 35.

At the rear side of the table or frame 1 and extending thereon in a direction transversely of the guides 98 and 99 is a conveyer comprising the belt 107 the ends of which pass around rollers 108 (Fig. 6) and 109 (Fig. 12). This conveyer is made of a width approximately equal to the length of the longest blank which the machine is designed to fold. It is driven continuously in the direction indicated by the arrow in Figs. 1 and 6 by means of a gear wheel 110, attached to the roller 109, meshing with the gear wheel 111 connected to the shaft 35 by intermeshing bevel gear wheels 112. The conveyer 107 is located beneath the plane of the guides 98 and 99 and forms a floor with which the folding devices coöperate, as will be more fully described hereinafter. Arranged above the conveyer, at the rear of the last mentioned guide, and resting thereon is a presser belt 113, supported at its ends by the rollers 114 (Fig. 6) and 115, (Fig. 12) journaled in inner and outer frame pieces 120 and 121, which also carry intermediate supporting and pressing rollers 122 and 123 respectively. Means for tightening the belt 113 are provided at its outer end comprising a roller 124 supported on vertically adjustable arms 125. Motion is imparted to this belt by means of the gear wheel 126, carried at the rear end of the roller 109, meshing with a similar gear wheel 127 on the roller 115 (Fig. 2).

The rear ends of the guides 98 and 99 form supports on which the box blank, as it is projected from the rack, is held at the commencement of the folding operation and as these supports also assist in such operation, they form part of the folding devices. The guide 99 is arranged stationary upon the frame of the machine and at its rear side it is provided with an upwardly extending lip or shoulder 128 which prevents the box blank, as it is carried by the transporting devices, or conveyer belts 90 and 91, from becoming twisted and it is also provided with a longitudinally adjustable stop 129 (Fig. 1) which arrests one side of the blank, a similar stop 130 being also provided on the guide 98. As it is necessary to adjust the latter to accommodate blanks of various widths, it is mounted upon brackets 131 and 132, located respectively at the inner and outer sides of the belt 107, each of which is provided with a threaded box 133 through which extend adjusting screws 134, supported in bearings 135 and connected for simultaneous adjustment by a sprocket chain 136. The lower ends of the brackets extend forwardly beneath the guide or support 98 and between them are journaled a plurality of rollers 137 which support that portion of the belt 107 termed the floor. One or more of these rollers may be journaled in boxes 138 operated upwardly by springs 139, as shown in Fig. 6. Also supported on the screws 134 are boxes 140 carrying a cross bar 145 on which are mounted arms 146 in which are adjustably secured rods 147 supporting a guide 148, similar to the guide 128. Also supported on this rod and projecting forwardly therefrom are arms 150 which are curved upwardly, as shown in Fig. 7, and provided with the ends 151 overhanging the guide or support 98 which serve to retard the upward movement of the wide flap at this side of the blank when the latter is depressed between the guides.

Coöperating with the guides or supports 98 and 99 are two beater rods 152, supported in heads 153, adjustable longitudinally on a rock shaft 154, journaled in bearings 155, at the rear side of the machine. These arms when in normal position extend above the supports or guides in proximity thereto and their outer ends are offset or bent downwardly, as shown in Fig. 3, so that when the shaft 154 is rotated their outer ends will lie flat against the floor or belt 107. The rock shaft is oscillated by an arm 161 connected to a vertically movable bar 160 provided with a pin 162 traveling in a cam slot in a disk 163. The latter is mounted on a shaft 164 which is rotated by the driving shaft 35 through the two sets of bevel gear wheels 165 and 166. The beater rods 152 moving downwardly upon a box blank causes its central portion to be depressed into engagement with the floor or conveyer with its side flaps projecting vertically in engagement with the side edges of the supports 98 and 99 and the next operation is the folding of these panels or edges upon the central portion of the blank, with the portion or panel provided with the pasting flap 44 beneath the other edge or panel. This part of the operation is accomplished by the folders, located beneath the guides or supports, which move relatively toward each other and downwardly toward the floor, or conveyer, to rotate the vertically extending panels at the edges of the blank into a horizontal position. In the present illustration this feature of the invention is shown as comprising folders or wings 167 and 168, the former being journaled at its ends in the inner and outer frame pieces 120 and 121, beneath the support 99, the latter being pivotally supported in the brackets 131 and 132, beneath the support 98. The upper edge of the wing or folder 167 is notched to provide fingers 169 (Fig. 3) and depending from the support 99 and extending into said notches, when the wing is in its normal position, are fingers 170. The journal pin at one end of the wing 167 projects outwardly through the frame piece 120 and is provided with a crank arm 175 which is connected at its outer end to a rod 176 attached to a yoke 177, surrounding the shaft 164 and provided with an elongated aperture 178 and a pin or roller 180 periodically engaged by a cam 179.

The wing or folder 168 comprises end pieces in which are journaled two or more rods or rollers 181 (Fig. 7). One of the end pieces is provided with an extension or arm 182 (Fig. 6) attached by a link 183 to an arm 184 which is adjustably secured by a set screw 185 to a longitudinally movable bar 186, guided in brackets 187 on the main frame and operated in brackets 187 on the main frame and operated in one direction by a spring 188. Longitudinal movement is imparted to the bar 186 by a cam 189 on the shaft 164 coöperating with the roller 190 carried on an arm 195. The cams 179 and 189 are arranged relatively to each other on the shaft 164 so that upon each rotation thereof the wings or folders will be moved from their normal vertical position, shown in Fig. 6, to a horizontal position, as shown in Fig. 7, and the cams are so proportioned that the wing or folder 168 will move downwardly in advance of the folder 167 so that the panel carrying the pasting strip or flap, to which the glue has been applied, will underlie the other edge of the blank, the cams retaining the folders in this position for a sufficient length of time to permit the conveyer 107 to carry the folded blank from beneath these parts into engagement with the coöperating belt 113 where the blank remains a sufficient length of time to permit the glue or adhesive material to set. The belt 107, it will be noted, is moved in a direction to carry the box blank laterally with the overlapping portion at the advancing side of the blank so that it will not be disturbed as it is withdrawn from beneath the wing 167 and engages the conveyer belts.

The folded box blanks are delivered at the end of the machine onto a table 196, guided upon the frame pieces 197 and adjusted vertically by means of a screw 198 supported in bearings 199. On the table is mounted an outwardly movable abutment 200, against which the blanks are stacked, and at its inner end it is provided with a pivoted dog having an inclined shoulder 205 projecting above the edge of the table and engaging the lower edge of the blank deposited thereon, the upper edge of said blank being retained by a stationary shoulder 206 located above the table. The deposited blanks rest upon their edges and in order to rotate them into a vertical plane there is arranged between the table and the conveyer belts 107 and 113 a supplemental conveyer which curves downwardly, as shown in Fig. 12. This is composed of two or more narrow belts 207 and 208, the former passing around driving pulleys on the shafts 209 and 210, two or more intermediate pulleys 211 and a tightener 212, supported upon an adjustable arm 213. The belts 208 pass over the pulleys on shafts 214 and 215, and a tightener 216, carried upon an adjustable arm 217. The shafts 209 and 214 project beyond the rear side of the machine frame and are provided with intermeshing gear wheels 209[a] and 214[a] which are driven from the gear wheel 126 upon a pinion 209[b]. As the belts 207 and 208 are short and the driving pulleys are comparatively small in diameter, it is desirable that the pulleys on the shafts 210 and 215 be positively rotated and for this reason said shafts are provided with intermeshing gear wheels 210ª and 215ª to which rotary movement is imparted by a train of idler gear wheels 218, 219 and 220. Located directly beneath the last mentioned shafts are two discharge rollers 225 and 226 between which a box blank, as it emerges from the conveyer belts 207 and 208, is directed by a deflector 227. These rollers are positively driven by gear wheels 225ª and 226ª, the former of which meshes with the idler 220. The last mentioned parts are located directly above the inner end of the table 196, and each blank as it descends thereon is pushed outwardly beyond the shoulders or projections 205 and 206 by spring packing fingers 228 carried on an arm 229, pivoted at 230, and oscillated by a rod 231 connected to an arm 232, pivoted to a bracket 233, located centrally on the main frame 1. The arm 232 is provided with a pin or roller 234 lying in a cam slot 235 in a cam 236, on the shaft 164, the rotation of which causes an oscillation of the arm 229 whenever a box blank is deposited upon the table 196.

Mechanism for counting the deposited blanks by offsetting one of them whenever a predetermined number has been delivered to the table is arranged at the discharge end of the machine and is illustrated in Fig. 12. This mechanism comprises generally an offsetter 237 supported in a guide 238 and intermediate devices which cause it to be operated at predetermined intervals. The offsetter is connected by an adjustable link 239 to an arm 240, supported upon a transversely extending shaft 245, and it is normally retracted and held in inoperative position beneath the surface of the table by a spring 246, connected at one end to the frame and at its other extremity to an arm 247 also mounted on the shaft 245. Arranged upon the latter is an arm 248 having an upwardly extending end 249 on which is pivotally supported a latch 250. Pivotally mounted upon the arm 248 is a laterally movable controlling block 251, actuated in one direction by a spring 252, having at one side of its outer end a laterally projecting pin or roller 253 and provided at the other side of its other extremity with another pin or roller 254. Extending transversely above the arm 248 is a shaft 255 provided with a sprocket wheel 256 connected by a chain, or other driving connection 257, with a sprocket wheel 258 on the shaft 164. Mounted on the shaft 255 is a cam 259 which coöperates with the roller 253 to depress the arm 248 and elevate the offsetter 237 at certain intervals of time. A similar cam 260 is also secured to the shaft and is adapted to coöperate with the roller 254 to return the controlling block 251 to its normal position after the movement of the offsetter has been completed. The block 251 is provided with a notch 261 with which the inner end of the latch 250 normally engages to hold the pin or roller 253 out of the path of the cam 259. The devices for controlling the release of the block and the subsequent movement of the offsetter are operated by the folded box blanks as they are carried along by the conveyer and they comprise a ratchet wheel 262, mounted upon a shaft 263 and rotated intermittently by a pawl or dog 264, carried upon an arm 265, connected by a link 266 with a trip 267 journaled on the shaft 209. The trip is provided with a segmental surface 268, which conforms to the curved surface of the conveyer passing over its supporting pulley and it is notched or cut away, as indicated at 269, so that it will be disengaged from the box blank when it has been rotated by contact therewith a sufficient distance to actuate the ratchet wheel 262 the distance of one of its teeth, the trip being returned by a spring 270 attached to the arm 265. Extending outwardly from the shaft 263, beyond the periphery of the ratchet wheel, is an arm 275 in which is guided the upper end of a thrust rod 276, the lower end thereof being provided with a slot 277 receiving a pin 278 on the latch 250, the outer end of the latter being yieldingly connected to the rod by a contractile spring 279, which performs the dual function of rotating the latch 250 into engagement with the notch 251 and supporting the rod 276 in a normal elevated position. The periphery of the ratchet wheel 262 is provided with a plurality of ratchet teeth, fifty in the present instance being employed, one of which, such as 280, being made of less depth than the others so that when the dog 264 engages therewith its outer edge will be held in alinement with the end of the rod 276 causing the latter to be depressed, in the position shown in Fig. 12, to disengage the latch 250, and permit the controlling block 251 to be rotated by its spring 252 into the path of the cam 259. As before stated, when the parts are in this position, cam 259 will cause the offsetter to be elevated to project one of the blanks, thus indicating that fifty of them have been deposited upon the table, and the continued rotation of the shaft 255 will cause the cam 260 to engage the roller 254 and return the controlling block and permit the latch 250 to again lock it until the ratchet wheel 262 has made a complete rotation and the dog 264 again engages the shallow tooth 280.

The operation of the machine will now be readily understood. In the first instance the operator adjusts the side pieces 33, the gages 20 and guide arms 23, of the stack rack to receive the box blanks which it is desired to fold. The guide 98 is adjusted relatively to the stationary guide 99, by rotating the screws 134, and the glue wheel 42, with its coöperating parts is set by loosening the nut 46 and moving the section of the driving shaft 35ª longitudinally in the sleeve 45. After these operations are completed, the guide 148 and the arms 150 are adjusted in proper relationship to the guide 98 and the arm 184 is rigidly secured to the bar 186. Further adjustment of the machine is completed when the beater rods 152 are shifted on the rock shaft 154 so that when oscillated they will move in vertical planes and pass their respective guides 98 and 99 in proximity to their inner edges.

A pile of box blanks, as indicated by A, being stacked in the rack and rotary motion being imparted to the shaft 35, from the belt 41, the stack will be permitted to descend into engagement with the feeding rolls 6 whenever the arms are released by the high portion of the cam 76 passing out of engagement with the pin 77 on the yoke 78. When the stack is resting on the feed rolls the cam 87 engages the arm 88 and moves the rack 85 outwardly to rotate the pinion 80ª, which is connected by the pawl 83 to the pinion 82 on the shaft 5ª, thereby rotating each of the feed rolls a sufficient distance to project the lowermost box blank into engagement with the transporting devices or conveyer belts 90 and 91 which are moving continuously. These belts carry the box blank over the glue wheel 42 and deposit it at the rear ends of the guides or supports 98 and 99 where it is arrested in contact with the stops 129 and 130, in proper position between the guides 128 and 148. As soon as a box blank has arrived in this position the slot in the cam 163 draws the connecting rod 160 downwardly and rotates the rock shaft 154 to throw the arms 152 downwardly, from the position shown in Figs. 2 and 3, to force the central portion of the box blank into contact with the floor formed by the conveyer belt 107. The movement imparted to the arms 152 is sudden and they are returned immediately to the normal position before the cams 179 and 189, on the shaft 164, begin to move the folders or wings 167 and 168 into the operative position to fold the vertically extending side panels or flaps of the blank over the central portion thereof. The wings or folders are held in the operative position momentarily by the respective cams until the folded box blank is carried from beneath them by the conveyer belt 107 and is engaged beneath the belt 113 where it remains a sufficient length of time to allow the glue or adhesive material to set or harden before it is finally deposited on the table 196.

The blank as it emerges from between the conveyer belts 107 and 113 and enters between the belts 207 and 208 engages the trip 267 on the shaft 209 rotating the latter in the direction indicated by the arrow in Fig. 12 and depressing the pawl 264 a sufficient distance to actuate the ratchet wheel 262 a distance of one of its teeth. The box blank as it is discharged from the belts 207 and 208 and the rollers 225 and 226 is pushed outwardly on the table by the packing arms 228 operated at that time by the cam 235, on the shaft 164, imparting a rocking movement to the arm 232 and a similar movement to the arm 229 to which it is connected by the rod 231. Each succeeding box blank actuates the ratchet wheel 262, as before described, and when the pawl 264 engages the shallow tooth therein its outer edge also engages the upper end of the thrust rod 276, causing the latter to be depressed to release the latch 250 from engagement with the controlling block 251. The latter being released, is allowed to rotate, into the position shown in Fig. 13, beneath the cam 259, on the shaft 255, whereby a rocking movement is imparted to the arm 248 and the offsetter 237 elevated to move one of the folded box blanks above the others for the purpose of indicating that a predetermined number of them have been folded. The cam 260 subsequently engaging the roller 254 returns the controlling block 251 to its normal position and the latch 250, operated by its spring 278, engages therewith while the rod 276 is returned to its normal position.

A machine embodying my invention is capable of folding and gluing box blanks of various sizes and the arrangement of the various parts and the different driving connections between them which accurately timed in relation to one another permits the blanks to be folded with great rapidity.

By constructing the floor or bottom of the stack rack of a sufficient length to accommodate the longest blank and making the conveyer for conducting the folded blanks of a width to receive the widest blanks which the apparatus is designed to receive, the work necessary to adjust it to accommodate box blanks of different sizes is greatly simplified. Further, by arranging the conveyer to operate in a direction transversely to the direction of movement of the blanks as they pass out of the rack, the machine may be made compact so as to occupy but little floor space.

I claim as my invention:

1. In a box folding machine, the combination with supports adapted to receive a box blank, a movable conveyer located beneath the supports and means for depressing the blank between the supports, of devices for folding the lateral edges of the blank over its central portion and mechanism for operating the depressing means and folding devices.

2. In a box folding machine, the combination with supports adapted to receive a box blank, a movable conveyer located beneath the supports and means for depressing the blank between the supports, devices for folding the lateral edges of the blank over its central portion and holding the folded blank in engagement with the conveyer and mechanism for operating the depressing means and folding devices.

3. In a box folding machine, the combination with supports adapted to receive a box blank, a movable conveyer located beneath the supports and traveling laterally relatively thereto and arms movable relatively to the conveyer and passing the edges of the supports, of folders located beneath the supports and movable relatively toward each other and mechanism for operating the arms and folders successively.

4. In a box folding machine, the combination with supports adapted to receive a box blank, a movable conveyer located beneath the supports and traveling laterally relatively thereto and arms movable relatively toward and from the conveyer and passing the proximate edges of the supports, of folders operating relatively toward each other into engagement with the conveyer and mechanism for operating the arms and folders.

5. In a box folding machine, the combination with supports adapted to receive a box blank, a conveyer arranged beneath them and traveling laterally relatively to the supports and means for depressing the blank into engagement with the conveyer, of folders pivoted beneath the supports and mechanism for operating the depressing means and rotating the folders relatively toward each other over the conveyer.

6. In a box folding machine, the combination with supports adjustable relatively to each other and adapted to receive box blanks of various sizes, brackets carrying the supports and a floor arranged beneath the latter, of folders movable relatively over the floor and carried by the brackets, means movable past the supports for depressing the central portion of the blank beneath the folders and mechanism for operating said means and folders.

7. In a box folding machine, the combination with a floor, brackets located at opposite sides thereof and supports on the brackets extending above the floor, of a folder pivoted on the brackets beneath each of the supports, a rock shaft at one end of the supports, arms thereon adjustable relatively to the latter and mechanism for operating the shaft and folders.

8. In a box folding machine, the combination with a rack adapted to contain a stack of box blanks, supports adapted to receive said blanks and devices for transporting the latter from the rack to the supports, of devices for depressing the central portion of a blank between the supports and folding its lateral edges over said depressed portion, a conveyer for receiving the folded blank and mechanism for operating said devices and conveyer.

9. In a box folding machine, the combination with a rack adapted to contain a stack of box blanks, a conveyer and means for transporting said blanks from the rack to a position above the conveyer, of box folding mechanism comprising impact members for striking the box blanks downwardly onto the conveyer and folders for overlapping the edges of the blanks when the latter have been struck into engagement with the conveyer and means for operating the impact members and folders relatively to each other.

10. In a box folding machine, the combination with a rack adapted to contain a stack of box blanks, a conveyer moving in a direction transversely to the rack, and means for transporting the blanks from the latter to a position above the conveyer, of an impact member, means for causing it to strike the center portion of the blanks downwardly onto the conveyer and then retract, and folders for turning the edges of the blank over its central portion and holding the blank thus folded into engagement with the conveyer.

11. In a box folding machine, the combination with a rack adapted to receive box blanks having an open bottom, a feed roll and means for moving the latter and said bottom relatively to alternately support the box blanks, a shaft arranged in front of the rack and a roller thereon and means for supplying adhesive material to the roller, of a conveyer leading from the rack and passing the roller on the shaft, driving connections between the latter, the feed roll and conveyer, folding devices receiving the blank from the conveyer and means for operating the folding devices and shaft.

12. In a box folding machine, the combination with a rack adapted to receive box blanks having an open bottom, a shaft arranged at one side of the rack, a receptacle for adhesive material and a roller mounted on the shaft and having an edge extending into the receptacle, of a traveling conveyer located in front of the rack, a feed roll located beneath the receptacle and operated intermittently by the shaft to project a box blank into the conveyer, folding devices adapted to receive blanks from the conveyer and means for operating the folding devices and shaft.

13. In a box folding machine, the combination with a rack which is adjustable to receive box blanks of various sizes, a conveyer leading therefrom and folding devices receiving a blank from the conveyer comprising a stationary support and a relatively adjustable support, of arms coöperating with said supports, a wing pivoted beneath the stationary support, a driving shaft and connections between it and the wing, a second wing movable with the adjustable support, an operating member actuated by the driving shaft and adjustable connections between said member and the second wing.

14. In a box folding machine, the combination with a frame, a longitudinally extending conveyer thereon and a support located above it, a second support adjustable relatively to the first and a rack adapted to contain box blanks located in alinement with the supports, of means for transferring a box blank from the rack to the supports, devices coöperating with the latter to fold a blank and deliver it onto the conveyer and mechanism for operating the latter, transferring means and folding devices.

15. In a box folding machine, the combination with a rack adapted to receive box blanks, guides extending in front of the rack and means for ejecting a blank onto the guides, of a glue applying device located adjacent one of the guides, a conveyer located between the guides and folding devices receiving the blank from the conveyer and mechanism for operating the ejecting means, conveyer and folding devices.

16. In a box folding machine, the combination with a rack adapted to receive box blanks, guides extending in front of the rack one of which is movable relatively to the other, means for ejecting a box blank onto the guides, and a device for applying glue to one side of the blank, of folding devices at the outer ends of the guides, a conveyer for moving the blank along the latter and deliver it to the folding devices and mechanism for operating the ejecting means, folding devices and conveyer.

17. In a box folding machine, the combination with a rack adapted to receive box blanks, guides extending forwardly therefrom, devices for ejecting a blank onto the guides, means for operating them and a device for applying glue to one side of the blank, of a conveyer extending transversely of the guides and located beneath their outer ends, devices for folding the blank and depositing it on the conveyer, means for transporting a blank from one end of the guides to the other and mechanism for operating said transporting means, folding devices and conveyer.

18. In a box folding machine, the combination with a rack adapted to receive box blanks, guides extending forwardly therefrom, devices for ejecting a blank onto the guides, means for operating them and a device for applying glue to one side of the blank, of a conveyer extending transversely of the guides and located beneath their outer ends, devices for folding the blank and depositing it on the conveyer, means arranged at one side of the guides and pressing the folded box into engagement with the conveyer, means for transporting a blank from one end of the guides to the other and mechanism for operating said transporting means, folding devices and conveyer.

19. In a box folding machine, the combination with a rack adapted to receive box blanks, means for ejecting them longitudinally and a device for applying glue to the under surface of each blank at one side thereof, a conveyer traveling in a direction transverse to the direction of the feeding movement of the blanks, of folding devices receiving the ejected blanks and coöperating with the conveyer to superpose one of their lateral edges upon the other and mechanism for operating the ejecting and folding means and the conveyer.

20. In a box folding machine, the combination with a rack adapted to receive box blanks, means for ejecting them longitudinally and a device for applying glue to the under surface of each blank at one side thereof, of a conveyer, devices for folding the lateral edges of the blanks and superposing one edge upon the other with their glue bearing portions lowermost, means for operating the conveyer to remove the blanks from beneath the folding devices with their overlapping edges in advance of their underlying glue bearing edges, a presser engaging the blanks and holding them in contact with the conveyer and mechanism for operating the ejecting means, folding devices and conveyer.

21. In a box folding machine, the combination with a rack adapted to contain box blanks, devices receiving the blanks from the rack and folding them, a stacking table, a conveyer for transporting the blanks from the folding devices to the table, of an offsetter adapted to coöperate with a blank on the table, an arm connected thereto and a laterally movable controlling block, a shaft and a cam thereon adapted to coöperate with the block to rock the arm, a latch for holding the block out of alinement with the cam, devices for releasing the latch actuated by the blanks carried by the conveyer and mechanism for operating the folding devices, conveyer and cam shaft.

22. In a box folding machine, the combination with a rack adapted to contain box blanks, devices receiving the blanks from the rack and folding them, a stacking table, a conveyer for transporting the blanks from the folding devices to the table, of an offsetter adapted to coöperate with a blank on the table, an arm connected thereto and a laterally movable controlling block having two projections, a shaft, a cam thereon adapted to coöperate with one projection to operate the offsetter and a second cam adapted to engage the other projection to restore the block to its normal position, a latch for retaining it in said position and devices for releasing the latch actuated by the blanks carried by the conveyer and mechanism for operating the folding devices, conveyer and cam shaft.

23. In a box folding machine, the combination with a rack adapted to contain box blanks, devices receiving the blanks from the rack and folding them, a stacking table, a conveyer for transporting the blanks from the folding devices to the table, of an offsetter adapted to coöperate with a blank on the table, an arm connected thereto and a laterally movable controlling block having two projections, a shaft, a cam thereon adapted to coöperate with one projection to operate the offsetter and a second cam adapted to engage the other projection to restore the block to its normal position, a latch for retaining it in said position, a ratchet wheel having a shallow tooth, a pawl engaging the wheel and means for rotating the wheel actuated by blanks carried by the conveyer, a member coöperating with the latch operated by the pawl to release the block when the pawl is in engagement with the shallow tooth of said wheel and mechanism for operating the folding devices, conveyer and cam shaft.

ARTHUR B. COWLES.

Witnesses:
G. WILLARD RICH,
FLORENCE E. FRANCK.